(12) United States Patent
Takaki

(10) Patent No.: US 10,866,316 B2
(45) Date of Patent: Dec. 15, 2020

(54) OBJECT DETECTION APPARATUS AND OBJECT DETECTION METHOD

(71) Applicant: DENSO CORPORATION, Kariya, Aichi-pref. (JP)

(72) Inventor: Ryo Takaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 386 days.

(21) Appl. No.: 15/839,630

(22) Filed: Dec. 12, 2017

(65) Prior Publication Data

US 2018/0164424 A1    Jun. 14, 2018

(30) Foreign Application Priority Data

Dec. 14, 2016   (JP) .................... 2016-242668

(51) Int. Cl.
| | |
|---|---|
| *G01S 13/86* | (2006.01) |
| *G01S 13/42* | (2006.01) |
| *G01S 13/931* | (2020.01) |
| *G01S 7/40* | (2006.01) |
| *G08G 1/16* | (2006.01) |
| *G01S 7/41* | (2006.01) |

(52) U.S. Cl.
CPC .......... *G01S 13/867* (2013.01); *G01S 7/4004* (2013.01); *G01S 7/4021* (2013.01); *G01S 7/4026* (2013.01); *G01S 13/42* (2013.01); *G01S 13/931* (2013.01); *G08G 1/166* (2013.01); *G01S 7/412* (2013.01); *G01S 2007/403* (2013.01); *G01S 2013/9323* (2020.01); *G01S 2013/93185* (2020.01)

(58) Field of Classification Search
CPC .............................. G01S 13/584; G01S 7/352
USPC ....................................................... 342/70–72
See application file for complete search history.

(56) References Cited

U.S. PATENT DOCUMENTS

| | | | | |
|---|---|---|---|---|
| 6,380,849 B1 * | 4/2002 | Eckstine | ................. | B66C 13/46 340/436 |
| 6,492,935 B1 * | 12/2002 | Higuchi | ................. | G01S 13/931 342/70 |
| 6,941,211 B1 | 9/2005 | Kuroda et al. | | |
| 7,825,849 B2 * | 11/2010 | Tsuchida | ................. | G01S 17/86 342/70 |
| 8,102,306 B2 * | 1/2012 | Smith, Jr. | ............. | G01S 13/867 342/52 |
| 8,199,046 B2 * | 6/2012 | Nanami | ................. | G01S 13/867 342/52 |
| 8,466,827 B2 * | 6/2013 | Nanami | ................. | G01S 13/426 342/70 |

(Continued)

*Primary Examiner* — Marcus E Windrich
(74) *Attorney, Agent, or Firm* — Maschoff Brennan

(57) ABSTRACT

An object detection apparatus acquires a first position based on a detection result of an object ahead of an own vehicle detected by an electromagnetic wave sensor and a second position based on a detection result of the object detected by an image sensor. When determined that the objects are a same object, the object detection apparatus corrects either of the first position and the second position such that the first position and the second position are positions of the object detected at a same time, based on a time difference between a first amount of time required for the electromagnetic wave sensor to detect the object and a second amount of time required for the image sensor to detect the object. Position information of the object is calculated using the first position and the corrected second position, or the second position and the corrected first position.

11 Claims, 9 Drawing Sheets

(56) References Cited

U.S. PATENT DOCUMENTS

| | | | | |
|---|---|---|---|---|
| 8,493,196 B2* | 7/2013 | Pandy | ................... | B60W 30/16 |
| | | | | 340/435 |
| 8,604,968 B2* | 12/2013 | Alland | ...................... | B60R 1/00 |
| | | | | 342/70 |
| 8,610,620 B2* | 12/2013 | Katoh | ................... | G01S 13/931 |
| | | | | 342/52 |
| 9,390,624 B2* | 7/2016 | Minemura | ............ | G01S 13/867 |
| 2002/0147534 A1* | 10/2002 | Delcheccolo | ............ | H01Q 1/38 |
| | | | | 701/45 |
| 2009/0135065 A1 | 5/2009 | Tsuchida et al. | | |
| 2011/0050482 A1 | 3/2011 | Nanami | | |

* cited by examiner

OBJECT DETECTION APPARATUS AND OBJECT DETECTION METHOD

CROSS-REFERENCE TO RELATED APPLICATION

This application is based on and claims the benefit of priority from Japanese Patent Application No. 2016-242668, filed Dec. 14, 2016. The entire disclosure of the above application is incorporated herein by reference.

BACKGROUND

Technical Field

The present disclosure relates to an object detection apparatus that calculates position information of an object ahead of an own vehicle, and an object detection method.

Related Art

Conventionally, an object detection apparatus that calculates position information of an object ahead of an own vehicle using a position at which the object has been detected by an electromagnetic wave sensor and a position at which the object has been detected by an image sensor is disclosed. Specifically, the object detection apparatus determines whether or not the objects detected by the electromagnetic wave sensor and the image sensor are the same object using the respective positions of the objects detected by the electromagnetic wave sensor and the image sensor. When the objects are determined to be the same object, the object detection apparatus calculates the position information, such as a width of the object, using the positions.

JP-A-2010-61567 discloses an object detection apparatus that corrects a position detected by an electromagnetic wave sensor using a position detected by an image sensor. The object detection apparatus then calculates position information of an object based on the corrected position.

A time difference is present between an amount of time required for the electromagnetic wave sensor to detect the position based on the object and an amount of time required for the image sensor to detect the position based on the object. For example, in cases in which the amount of time required for the electromagnetic sensor to detect the position of the object is shorter than the amount of time required for the image sensor to detect the position of the object, depending on timings at which the object detection apparatus acquires the positions, a second position that is the position detected by the image sensor may be a position of the object at a time before the time of a first position that is the position detected by the electromagnetic wave sensor. Therefore, an error may occur in the position information of the object as a result of such first position and second position being used to calculate the position information.

SUMMARY

It is thus desired to provide an object detection apparatus that is capable of reducing error in position information of an object when the position information is calculated through combined use of detection results from an electromagnetic wave sensor and an image sensor, and an object detection method.

An exemplary embodiment provides an object detection apparatus that includes: an acquiring unit that acquires a first position based on a detection result of an object ahead of an own vehicle that is repeatedly detected by an electromagnetic wave sensor, and a second position based on a detection result of the object that is repeatedly detected by an image sensor; an object determining unit that determines whether or not an object detected by the electromagnetic wave sensor and an object detected by the image sensor are a same object based on the first position and the second position; a correcting unit that corrects, when the object determining unit determines that an object detected by the electromagnetic wave sensor and an object detected by the image sensor are a same object, either of the first position and the second position such that the first position and the second position are positions of the object detected at a same time, based on a time difference between a first amount of time required for the electromagnetic wave sensor to detect the object and a second amount of time required for the image sensor to detect the object; and a calculating unit that calculates position information of the object using the first position and corrected second position, or the second position and corrected first position.

In the above-described configuration, an object detection apparatus acquires the first position based on the detection result of the object that is repeatedly detected by the electromagnetic wave sensor and the second position based on the detection result of the object that is repeatedly detected by the image sensor. The object detection apparatus then calculates the position information of the object using the acquired first position and second position. However, when a time difference is present between the first amount of time required for the electromagnetic wave sensor to detect the object and the second amount of time required for the image sensor to detect the object, a deviation in position accompanying the time difference may occur between the first position and the second position.

Therefore, in a state in which the relative positions of the own vehicle and the object change as a result of the own vehicle traveling, error may occur in the position information when the position information of the object is calculated using the first position and the second position. In this regard, when an object detected by the electromagnetic wave sensor and an object detected by the image sensor are determined to be a same object, the correcting unit corrects either of the first position and the second position such that the first position and the second position are positions of the object detected at the same time, based on the time difference between the first amount of time required for the electromagnetic wave sensor to detect the object and the second amount of time required for the image sensor to detect the object. Then, the calculating unit calculates the position information of the object using the first position and corrected second position, or the second position and corrected first position.

In this case, the deviation in position between the first position and the second position is corrected using the time difference in the amounts of time required for the electromagnetic wave sensor and the image sensor to detect the object. As a result, error in the position information calculated using both corrected positions can be reduced. A concept herein is such that the first position and the second position based on the detection results of the object include the respective detection values of the electromagnetic wave sensor and the image, and values calculated based on the detection values.

DESCRIPTION OF THE EMBODIMENTS

Figure 1A:
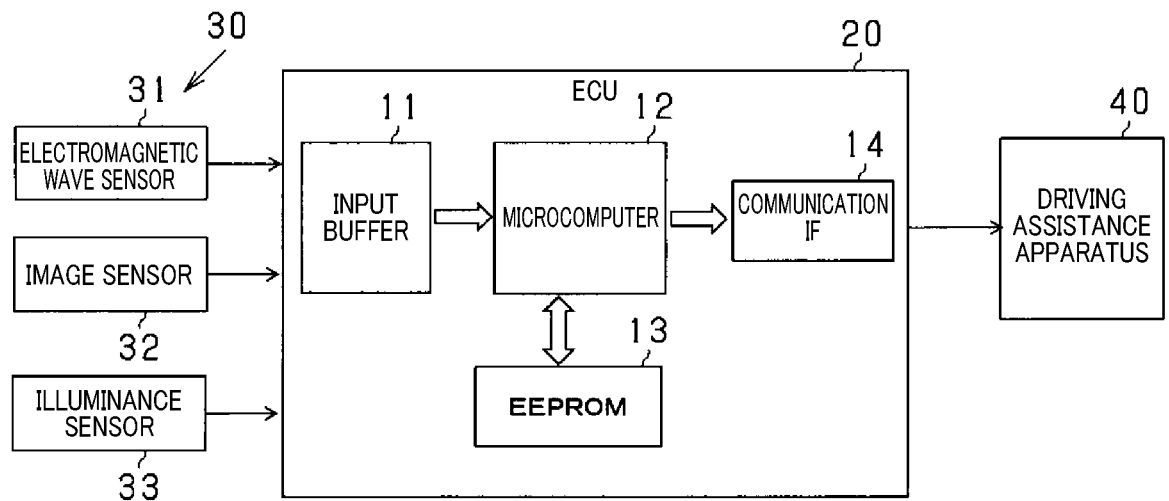
FIG. 1A is a configuration diagram of a vehicle control apparatus according to a first embodiment.

Embodiments of an object detection apparatus and an object detection method will hereinafter be described with reference to the drawings. Sections that are identical or equivalent to each other among the following embodiments are given the same reference numbers in the drawings. Descriptions of sections having the same reference numbers are applicable therebetween.

First Embodiment

A system 100 shown in FIG. 1A is mounted in a vehicle CS. The system 100 detects an object that is positioned ahead of the own vehicle CS. When a risk of collision between the object and the own vehicle CS is present, the system 100 performs an operation to avoid or mitigate the collision between the own vehicle CS and the object. According to the present embodiment, the system 100 includes various sensors 30, an electronic control unit (ECU) 20, and a driving assistance apparatus 40. The ECU 20 functions as the object detection apparatus.

The various sensors 30 are connected to the ECU 20. The various sensors 30 output detection results regarding objects to the ECU 20. In FIG. 1A, the various sensors 30 include an electromagnetic wave sensor 31, an image sensor 32, and an illuminance sensor 33. The illuminance sensor 33 detects brightness of around the own vehicle CS. In cases in which differentiation is made between an object detected through use of the electromagnetic wave sensor 31 and an object detected through use of the image sensor 32, among objects to be detected, the object detected by the electromagnetic wave sensor 31 is referred to as an electromagnetic wave target and the object detected from a captured image is referred to as an image target.

The electromagnetic wave sensor 31 is disposed on a front side of the own vehicle CS in a state in which a transmission direction of transmission waves faces ahead of the own vehicle CS. The electromagnetic wave sensor 31 transmits transmission waves that have directionality, such as millimeter waves or radar waves. The electromagnetic wave sensor 31 then detects a first detection position P1 and a relative speed with reference to the own vehicle CS from reflected waves that are reflected from the electromagnetic wave target based on the transmission waves. The first detection position P1 and the relative speed are detection results regarding an object. Subsequently, the electromagnetic wave sensor 31 transmits the first detection position P1 and the relative speed to the ECU 20 at a predetermined cycle.

Figure 2:
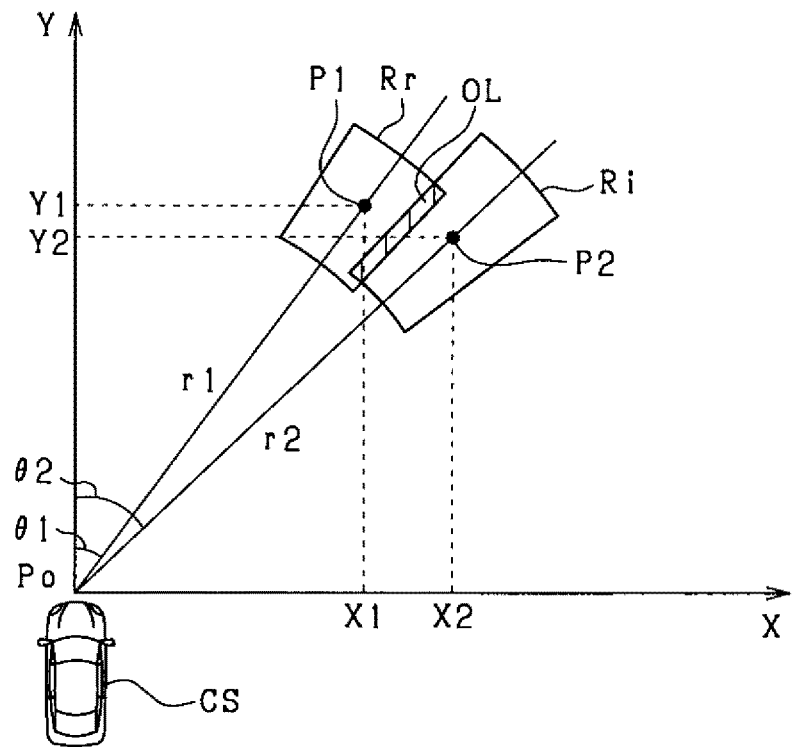
FIG. 2 is a diagram for explaining a first position and a second position acquired by an ECU in the first embodiment.

As shown in FIG. 2, the first detection position P1 includes a first distance r1 from the own vehicle CS to the object and a first azimuth θ1 with reference to the own vehicle CS. The first distance r1 is acquired as a linear distance from the own vehicle CS to the object.

The image sensor 32 is disposed on the front side of the own vehicle CS in a state in which an imaging direction thereof faces ahead of the own vehicle CS. The image sensor 32 acquires a captured image that captures an area in front of the own vehicle CS and detects an object from the captured image. The image sensor 32 is composed of image sensor elements, such as charge-coupled devices (CCDs), that are vertically and laterally arranged. The quantity of the image sensor elements depends on resolution. The captured image acquired by the image sensor 32 is formed by pixels based on the resolution of the image sensor 32. According to the present embodiment, the image sensor 32 is described as being a single-lens camera. However, a stereo camera may also be used.

A second detection position P2 includes a distance r2 and azimuth information. The distance r2 is acquired as a linear distance from the own vehicle CS to the object. The azimuth information indicates an angle at each position of the object with reference to the image sensor 32. Of the positions, a position at the center of the object in the lateral direction in FIG. 2 is indicated as an image azimuth θ2. In addition, the azimuth information includes a width angle that is a difference in azimuth between left and right lateral positions of the object.

According to the present embodiment, the image sensor 32 recognizes an object from the captured image by a template matching process using a dictionary that is registered in advance. In the dictionary, templates for the overall object are prepared for each type of object. In addition, the image sensor 32 calculates the distance r2 based on a ratio of a length from a position on a lower end of the object recognized in the captured image to a lower end of the captured image and a length from a focus of expansion (FOE) calculated in advance in the captured image to the lower end of the captured image. Furthermore, the image sensor 32 calculates the image azimuth θ2 and a width angle θw based on the azimuth at each position of the object that has been recognized.

The ECU 20 includes an input buffer 11, a microcomputer 12, an electrically erasable programmable read-only memory (EEPROM: registered trademark) 13, and a communication interface (IF) 14. The input buffer 11 temporarily records therein the first detection position P1 repeatedly transmitted from the electromagnetic wave sensor 31 and the second detection position P2 repeatedly transmitted from the image sensor 32. The microcomputer 12 is configured as a known computer that includes a central processing unit (CPU), a read-only memory (ROM), a random access memory (RAM), and the like (not shown). Functions for performing recognition of a position of an object ahead of the own vehicle CS and collision avoidance control to avoid a collision with the recognized object are actualized by the CPU running a program stored in the ROM. The EEPROM 13 functions as a storage area for data and the like processed in the ECU 20, when a main power supply of the ECU 20 is turned off. The communication IF 14 transmits an output signal from the microcomputer 12 to the driving assistance apparatus 40 that is connected to the ECU 20.

Figure 1B:
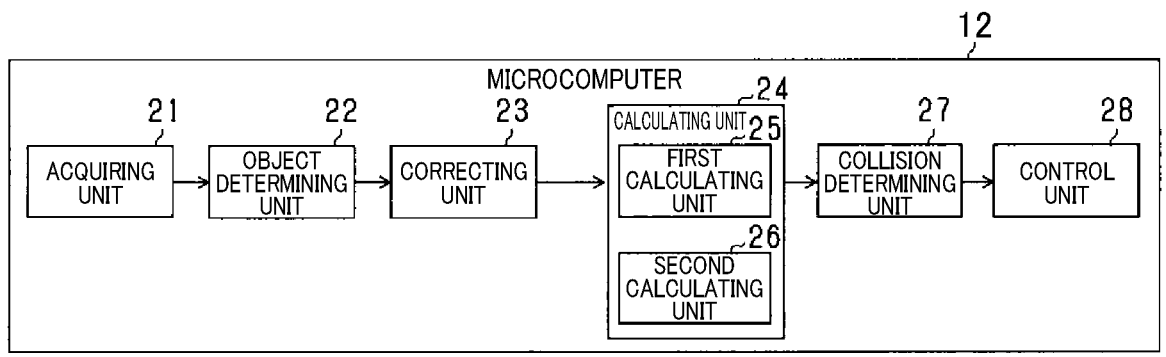
FIG. 1B is a functional block diagram of a microcomputer in the first embodiment.

FIG. 1B is a functional block diagram mainly showing functions related to the collision avoidance control, among the functions provided by the microcomputer 12.

An acquiring unit 21 acquires the first detection position P1 of an object that is repeatedly transmitted from the electromagnetic wave sensor 31. The acquiring unit 21 also acquires the second detection position P2 of an object that is repeatedly transmitted from the image sensor 32. Specifically, the acquiring unit 21 acquires the first detection position P1 and the second detection position P2 by latching the first detection position P1 and the second detection position P2 that are repeatedly updated in the input buffer 11.

As shown in FIG. 2, the acquiring unit 21 calculates an electromagnetic wave position (X1, Y1) based on the first detection position P1. The electromagnetic wave position is a position on an XY plane. On the XY plane, a lateral direction of the own vehicle CS is an X-axis direction and a direction in which an imaging axis of the image sensor 32 extends is a Y-axis direction. Here, on the XY plane in FIG. 2, of a tip end position of the own vehicle CS, a position in which the electromagnetic wave sensor 31 is provided is set as a reference point P0. Of the electromagnetic wave position, X1 indicates a distance in the lateral direction (X-axis direction) from the reference point P0 to the object. In addition, Y1 indicates a distance in an advancing direction (Y-axis direction) from the reference point P0 to the object.

The acquiring unit 21 also calculates an image position (X2, Y2) that is a position on the XY plane, based on the second detection position P2. Of the image position, X2 indicates a distance in the lateral direction (X-axis direction) from the reference point P0 to the object. In addition, Y2 indicates a distance in the advancing direction (Y-axis direction) from the reference point P0 to the object.

According to the present embodiment, the first detection position P1 and the electromagnetic wave position correspond to a first position. The second detection position P2 and the image position correspond to a second position. Therefore, according to the present embodiment, when the first position is described, the first detection position P1 and the electromagnetic wave position are included. When the second position is described, the second detection position P2 and the image position are included.

An object determining unit 22 determines whether or not the objects are the same object based on the first position and the second position acquired by the acquiring unit 21. According to the present embodiment, the object determining unit 22 determines that the electromagnetic wave target and the image target are the same object when an overlapping area OL is present between an electromagnetic wave search area Rr and an image search area Ri. The electromagnetic wave search area Rr is set based on the first detection position P1. The image search area Ri is set based on the second detection position P2.

As shown in FIG. 2, the electromagnetic wave search area Rr is an area that is given a width that corresponds to an amount of expected error in each of a distance direction and an azimuth direction, with reference to the first detection position P1. The amounts of expected error are set in advance based on characteristics of the electromagnetic sensor 31. For example, an area that is extended by the amount of expected error in the distance direction and the amount of expected error in the angle of the azimuth direction from the first detection position P1 (r1, θ1) is set as the electromagnetic wave search area Rr.

The image search area Ri is an area that is given a width that corresponds to an amount of expected error in each of the distance direction and the azimuth direction, with reference to the second detection position P2. The amounts of expected error are set in advance based on characteristics of the image sensor 32. For example, in FIG. 2, an area that is extended by the amount of expected error in the distance direction and the amount of expected error in the angle of the azimuth direction from the second detection position P2 (r2, θ2) is set as the image search area Ri.

When the objects are determined to be the same object, a calculating unit 24 calculates position information of the object using the first position and the second position. According to the present embodiment, the calculating unit 24 calculates a lateral position and an object width W as the position information. The lateral position indicates a center position of the object in the X-axis direction (lateral direction). The object width W indicates a size of the object in the X-axis direction. Therefore, the calculating unit 24 includes a first calculating unit 25 that calculates the lateral position and a second calculating unit 26 that calculates the object width W. In addition, the calculating unit 24 may calculate a merged position by combining the distance r1 acquired as the first position and the image azimuth θ2 acquired as the second position.

Figure 3:
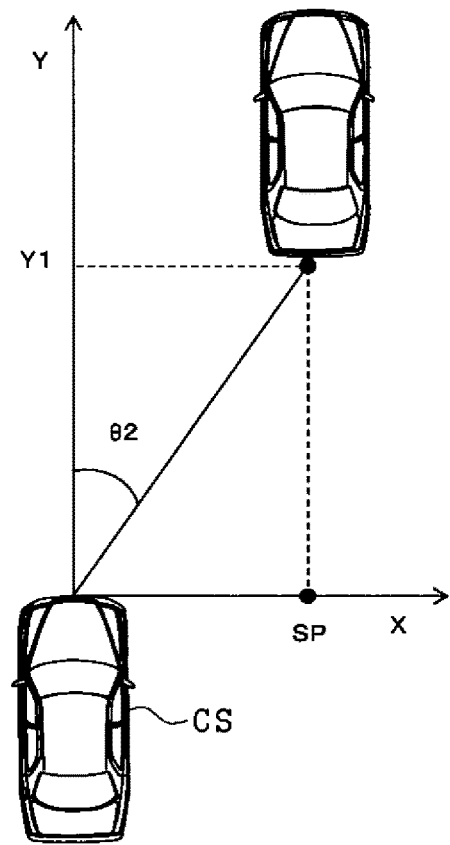
FIG. 3 is a diagram for explaining position information in the first embodiment.

As shown in FIG. 3, the first calculating unit calculates the lateral position using the electromagnetic wave distance Y1 acquired as the first position and the image azimuth θ2 acquired as the second position. For example, the first calculating unit 25 calculates the lateral position using an expression (1), below:

$$SP = Y1 \times \tan(\theta 2) \tag{1}$$

Here, SP denotes the lateral position.

Figure 4:
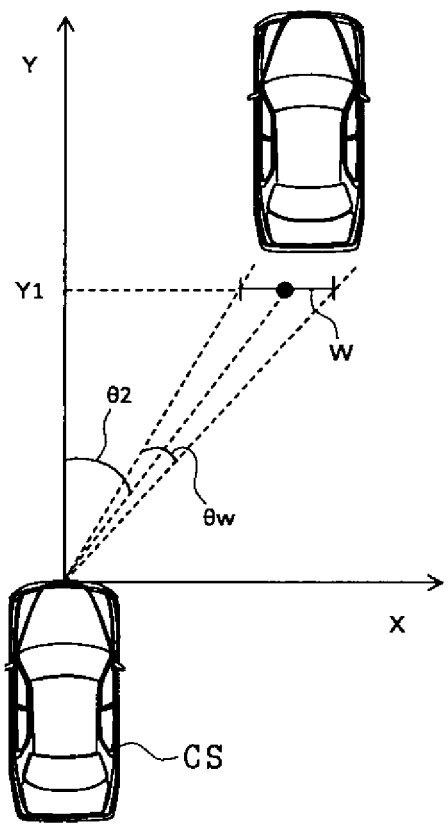
FIG. 4 is a diagram for explaining position information in the first embodiment.

As shown in FIG. 4, the second calculating unit 26 calculates the object width W using the image azimuth θ2 and the width angle θw acquired as the second position and the electromagnetic wave distance Y1 acquired as the first position. For example, the second calculating unit 26 calculates the object width W using an expression (2), below.

$$W = Y1 \times \{\tan(\theta w + \theta 2/2) - \tan(\theta w - \theta 2/2)\} \tag{2}$$

Here, W denotes the object width.

A collision determining unit 27 determines a likelihood of a collision between the object and the own vehicle CS. The collision determining unit 27 determines whether or not the object will collide with the own vehicle CS based on the lateral position calculated by the calculating unit 24. Specifically, the collision determining unit 27 determines that the likelihood of a collision between the object and the own vehicle CS is present when the calculated lateral position intersects with a front face of the own vehicle CS.

A control unit 28 controls driving of the driving assistance apparatus 40, thereby performing the collision avoidance control to avoid a collision between the own vehicle CS and the object. Specifically, when the collision determining unit 27 determines that the object and the own vehicle CS will collide, the control unit 28 calculates an operation threshold based on the calculated object width W The operation threshold is used to set an operation timing for the collision avoidance control.

Then, the control unit 28 compares the operation threshold and a time-to-collision (TTC). When the TTC is greater than the operation threshold, the control unit 28 performs the collision avoidance control. The TTC is an evaluation value that indicates the number of seconds to collision when the own vehicle CS continues to travel at a current own-vehicle speed. For example, the control unit 28 calculates the TTC by dividing the electromagnetic wave distance Y1 by the relative speed of the object detected by the electromagnetic wave sensor 31.

Figure 5:
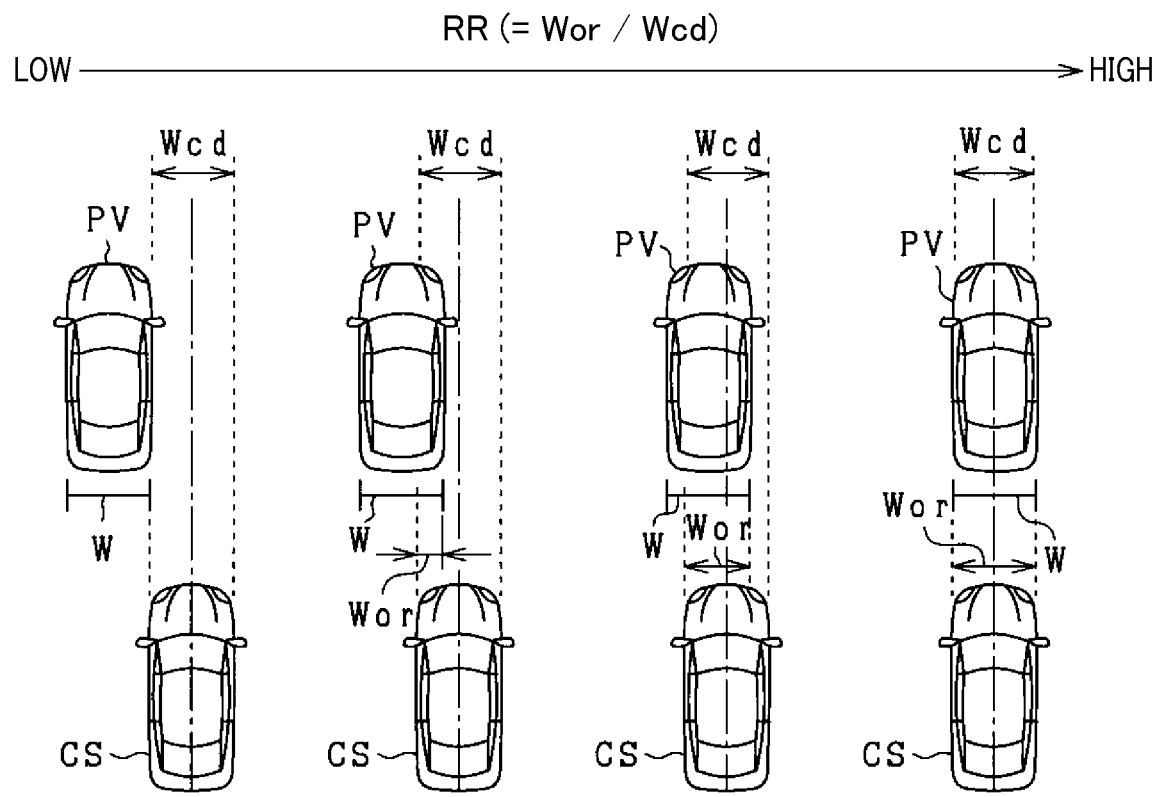
FIG. 5 is a diagram for explaining a lap ratio in the first embodiment.

The control unit 28 sets the operation threshold based on a lap ratio RR. The lap ratio RR indicates an overlap ratio in the lateral direction between a determination area Wcd and the object width W. The determination area Wcd is virtually set ahead of the own vehicle. As shown in FIG. 5, the lap ratio RR indicates the proportion of the length over which the object width W and the determination area Wcd overlap in the lateral direction. The determination area Wcd is an area that is virtually set ahead of the own vehicle CS and extended in the lateral direction by a predetermined length. According to the present embodiment, a lateral width of the front face of the own vehicle CS is set as the determination area Wcd.

The ECU 20 calculates the lap ratio RR by substituting the length of the object width W that overlaps with the determination area Wcd in an expression (3), below.

$$RR=Wor/Wcd \quad (3)$$

Here, Wor denotes the length of overlap with the determination area Wcd in the X-axis direction when the position of the object width W is set with reference to the lateral position of the object.

In a state in which a preceding vehicle PV is present ahead of the own vehicle CS, when the vehicle width (determination area Wcd) of the own vehicle CS and the object width W of the preceding vehicle PV overlap, the risk of collision changes based on the lap ratio RR. That is, in FIG. 5, the risk of collision decreases as the lap ratio RR between the own vehicle CS and the preceding vehicle PV decreases (towards the left side in FIG. 5). Meanwhile, the risk of collision increases as the lap ratio RR between the own vehicle CS and the preceding vehicle PV increases.

Therefore, because less urgency is required regarding the timing of an avoidance operation performed by a driver as the lap ratio RR decreases and the risk of collision decreases, the control unit 28 sets the operation threshold such that the operation timing is delayed as the lap ratio RR decreases. Meanwhile, because greater urgency is required regarding the timing of the avoidance operation performed by the driver as the lap ratio RR increases and the risk of collision increases, the control unit 28 sets the operation threshold such that the operation timing is earlier as the lap ratio RR increases The driving assistance apparatus 40 is a warning apparatus that issues a warning sound to the driver or a brake apparatus that decelerates the vehicle speed of the own vehicle CS. When the likelihood of the object colliding with the own vehicle CS is present, the driving assistance apparatus 40 performs various operations to avoid collision with the object. In cases in which the driving assistance apparatus 40 is the brake apparatus, the driving assistance apparatus 40 operates automatic braking when the TTC is less than the operation threshold. In addition, in cases which the driving assistance apparatus 40 is the warning apparatus, the driving assistance apparatus 40 issues the warning sound when the ITC is less than the operation threshold.

Figure 6:
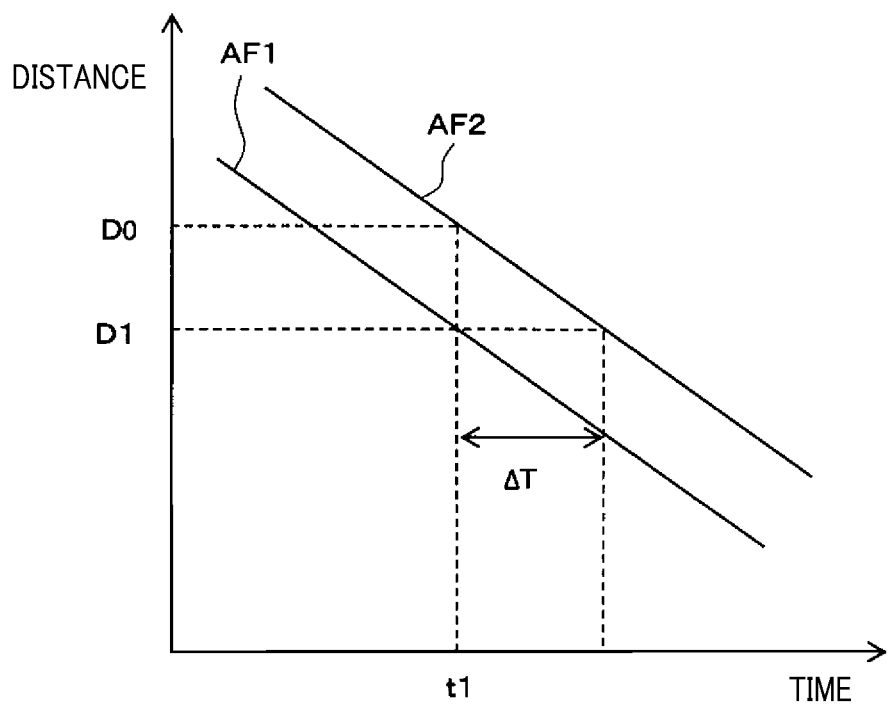
FIG. 6 is a graph in which a horizontal axis indicates passage of time and a vertical axis indicates detection position in the first embodiment.

Here, a time difference ΔT is present between a first amount of time required for the electromagnetic wave sensor 31 to detect an object and a second amount of time required for the image sensor 32 to detect an object. A graph shown in FIG. 6 indicates changes in a relative position of an object detected ahead of the own vehicle CS, together with passage of time. FIG. 6 shows a relationship between time and distance when the object ahead of the own vehicle CS is approaching the own vehicle.

In FIG. 6, when the distance to an object is acquired, the time difference ΔT is present between the first amount of time required for the electromagnetic wave sensor 31 to detect the object and the second amount of time required for the image sensor 32 to detect the object. Therefore, at the timing at which the electromagnetic wave sensor 31 detects the distance D1, the image sensor 32 has not detected the distance D1. Rather, the image sensor 32 detects D0 that is a position of the object before distance D1. Therefore, at the same time t1, a deviation in position indicated by the time difference ΔT is present between the position of the object detected by the electromagnetic wave sensor 31 and the position of the object detected by the image sensor 32.

Consequently, in a state in which the relative positions of the own vehicle CS and the object change as a result of the own vehicle CS traveling, the first position based on the detection result from the electromagnetic sensor 31 and the second position based on the detection result from the image sensor 32 indicate the positions of the object at differing times. As a result of the ECU 20 calculating the position information of the object using the first position, an error may occur in the position information.

Therefore, the ECU 20 includes a correcting unit 23. The correcting unit 23 corrects either of the first position and the second position such that the first position and the second position are the positions of the object at the same time, based on time difference information indicating the time difference ΔT between the first amount of time and the second amount of time. When correction is performed to adjust the first position to that of the time of the second position, the correcting unit 23 corrects the first position using the time difference information and an amount of change per unit time of the first position. In addition, when the second position is adjusted to that of the time of the first position, the correcting unit 23 corrects the second position using the time difference information and an amount of change per unit time of the second position.

According to the first embodiment, the ECU 20 holds the time difference information that indicates the time difference ΔT between the first amount of time and the second amount of time as a value prescribed in advance. As an example of a method for calculating the time difference information held by the ECU 20, as shown in FIG. 6, first, an approximation formula AF1 is calculated. In the approximation formula AF1, a horizontal axis indicates time and a vertical axis indicates the detection result (distance) regarding the object from the electromagnetic sensor 31.

In a similar manner, an approximation formula AF2 is also calculated. In the approximation formula AF2, a horizontal axis indicates time and a vertical axis indicates the detection result regarding the object from the image sensor 32. Here, the detection result regarding the object from the electromagnetic sensor 31 and the detection result regarding the object from the image sensor 32 are required to be the same value. The time difference information can then be calculated from an average value of the difference between the same detection results of the approximation formulas AF1 and AF2.

The time difference information may also be calculated from design values that are based on principles of the electromagnetic sensor 31 and the image sensor 32. In this case, for example, when A1 seconds are required from transmission of the transmission waves from the electromagnetic wave sensor 31 to reception of the reflected waves (reception waves), B1 seconds are required for calculation of the distance to the object based on the reflected waves by the electromagnetic wave sensor 31, and C1 seconds are required for the electromagnetic wave sensor 32 to transmit the calculated distance to the ECU 20, the first amount of time required for the electromagnetic wave sensor 31 to detect the object is calculated as A1+B1+C1.

In addition, when A2 seconds are required for the image sensor 32 to capture an image of the area ahead of the own vehicle, B2 seconds are required for the image sensor 32 to recognize the object and calculate the distance, and C2 seconds are required for the image sensor 32 to transmit the calculated distance, the second amount of time required for the image sensor 32 to detect the object is calculated as A1+B2+C2. The time difference is then calculated from the difference between the calculated first amount of time and second amount of time.

Next, the collision avoidance control performed by the ECU 20 will be described with reference to FIG. 7. The ECU 20 performs the processes shown in FIG. 7 at a predetermined cycle. In addition, an example in which the preceding vehicle PV that is positioned ahead of the own vehicle CS is to be detected is described.

At step S11, the ECU 20 acquires the first position and the second position. The ECU 20 latches the first detection position P1 and the second detection position P2 recorded in the input buffer 11 at the same timing and thereby acquires both positions P1 and P2 at the same timing. Then, the ECU 20 calculates the electromagnetic wave position (X1, Y1) from the detected first detection position P1 and the image position (X2, Y2) from the second detection position P2. Step S11 functions as an acquisition step.

At step S12, the ECU 20 performs the determination regarding whether or not objects are the same object based on the first position and the second position acquired at step S11. Specifically, the ECU 20 determines that the electromagnetic wave target and the image target are the same object when the overlapping area OL is present between the electromagnetic wave search area Rr set based on the first position and the image search area Ri set based on the second position. Step S12 functions as an object determination step.

When determined that the electromagnetic wave target and the image target are the same object (YES at step S12), at step S13, the ECU 20 calculates the amounts of change per unit time in the first position and the second position. According to the present embodiment, the ECU 20 calculates the amount of change per unit time in the electromagnetic wave distance Y as the amount of change in the first position. In addition, the ECU 20 calculates the amount of change per unit time in the image azimuth $\theta 2$ as the amount of change in the second position. For example, the ECU 20 calculates the amount of change per unit time in the electromagnetic wave distance Y1 as a relative speed of the preceding vehicle PV with reference to the own vehicle CS. The detection result from the electromagnetic wave sensor 31 can be used as the relative speed of the preceding vehicle PV with reference to the own vehicle CS. In addition, the ECU 20 holds changes over time in the image azimuth $\theta 2$ as a history. The ECU 20 calculates the amount of change at each position per unit time using each position held in the history. Step S13 functions as an amount-of-change calculating unit.

Figure 8:
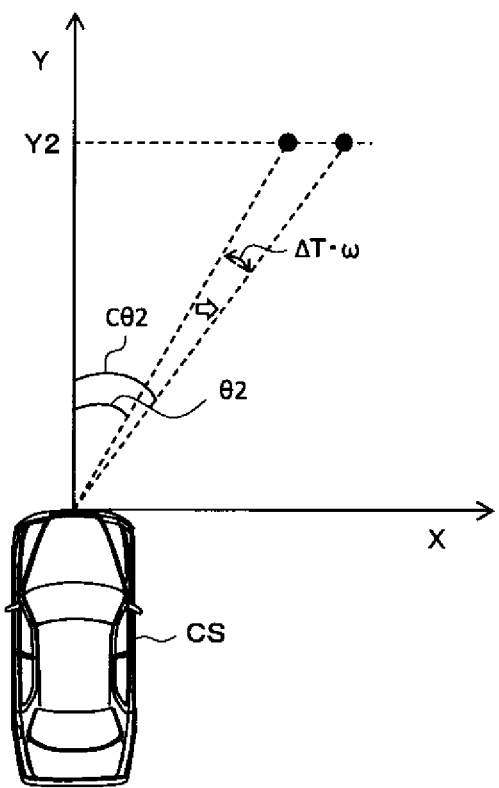
FIG. 8 is a diagram for explaining correction of image azimuth in the first embodiment.

At step S14, the ECU 20 calculates a corrected azimuth that is a value obtained by correcting the image azimuth $\theta 2$ acquired as the second position to that of the time of the first position. FIG. 8 is a diagram for explaining a method for correcting the image azimuth $\theta 2$.

When the lateral position of an object in which the changes over time is significant is calculated as the position information, the position of the image azimuth $\theta 2$ is preferably corrected with reference to an electromagnetic wave distance of which the time of detection is recent. Specifically, the ECU 20 uses an expression (4), below, and calculates a predicted position as the corrected azimuth. The predicted position is a position when the image azimuth $\theta 2$ is assumed to have advanced from the current position by an amount corresponding to the time difference information.

$$C\theta 2 = \theta 2 + \Delta T \times \omega \quad (4)$$

Here, $C\theta 2$ denotes the corrected azimuth. $\Delta T$ denotes the time difference information. $\omega$ denotes the amount of change in the image azimuth per unit time that is calculated at step S13.

At step S15, the ECU 20 calculates the lateral position of the object based on the corrected azimuth calculated at step S14 and the electromagnetic wave distance Y1. The ECU 20 calculates the lateral position by substituting $\theta 2$ in the expression (1), above, with the corrected azimuth $C\theta 2$.

Figure 9:
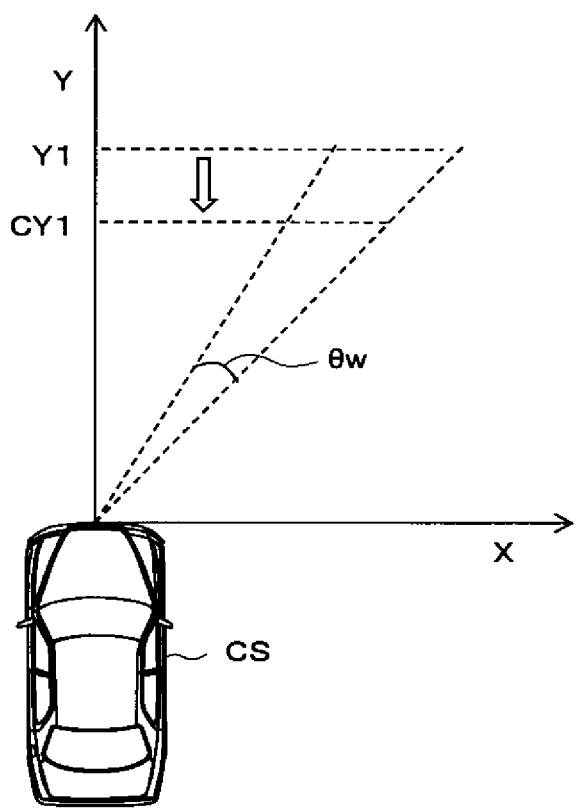
FIG. 9 is a diagram for explaining correction of electromagnetic wave distance in the first embodiment.

At step S16, the ECU 20 calculates a corrected distance that is a value to which the electromagnetic wave distance Y1 is corrected. FIG. 9 is a diagram for explaining a method for correcting the electromagnetic wave distance Y1. When an object width W in which the changes over time is small is calculated as the position information, the position of the electromagnetic wave distance is preferably adjusted to that of the time of detection of the image azimuth $\theta 2$ that has high reliability. Specifically, the ECU 20 uses an expression (5), below, and calculates a predicted position as the corrected distance. The predicted position is a position when the electromagnetic wave distance Y1 is assumed to have returned from the present position by an amount corresponding to the time difference information. Steps S14 and S16 function as a correction step.

$$CY1 = Y1 - \Delta T \times Vr1 \quad (5)$$

Here, $CY1$ denotes the corrected distance. $Vr1$ denotes the amount of change in the electromagnetic wave distance Y1 per unit time that is calculated at step S13.

At step S17, the ECU 20 calculates the object width W based on the corrected distance calculated at step S16 and the width angle $\theta w$. The ECU 20 calculates the object width W by substituting the electromagnetic wave distance Y1 in expression (2) with the corrected distance $CY1$. Steps S15 and S17 function as a calculation step.

At step S18, the ECU 20 determines the likelihood of a collision between the own vehicle CS and the object based on the lateral position calculated at step S25. When determined that the likelihood of the object colliding with the own vehicle CS is present (YES at step S18), the ECU 20 proceeds to step S19. Meanwhile, when determined that the likelihood of the object colliding with the own vehicle CS is not present (NO at step S18), the ECU 20 temporarily ends the processes in FIG. 7.

At step S19, the ECU 20 sets the operation timing for the collision avoidance control. First, the ECU 20 sets the position of the object width W on the XY plane by setting the center of the lateral width calculated at step S17 at the lateral position calculated at step S15. Then, the ECU 20 calculates the lap ratio RR between the object width W and the determination area Wcd, and sets the operation threshold based on the lap ratio RR.

At step S20, the ECU 20 operates the driving assistance apparatus 40 based on the operation threshold set at step S19. Therefore, when the TTC exceeds the operation threshold, the ECU 20 performs the collision avoidance control for the object and the own vehicle CS by driving the driving assistance apparatus 40.

According to the present embodiment described in detail above, the following excellent effects can be obtained.

When objects are determined to be the same object, the ECU 20 corrects either of the first position and the second position such that the first position and the second position are positions of the object detected at the same time. The ECU 20 performs the correction based on the time difference $\Delta T$ between the first amount of time required for the electromagnetic wave sensor 31 to detect the object and the second amount of time required for the image sensor 32 to detect the object.

Then, the EU 20 calculates the position information of the object using the first position and the corrected second position, or the second position and the corrected first position. In this case, as a result of the deviation in position between the first position and the second position being corrected using the time difference $\Delta T$ between the amounts of time required for the electromagnetic wave sensor 31 and the image sensor 32 to detect the object, error in the position information calculated using both corrected positions can be reduced.

The ECU 20 calculates the amount of change per unit time in the first position or the second position. The ECU 20 corrects either of the first position and the second position such that the first position and the second position are positions of the object detected at the same time, using the amount of change per unit time and the time difference $\Delta T$. In this case, a correction amount corresponding to the degree of change in the relative positions of the own vehicle CS and the object can be acquired. Even when the relative positions of the own vehicle CS and the object significantly change in time series, the first position or the second position can be appropriately corrected. Error in the position information can be reduced.

In addition, when the object width W that does not change over time is calculated as the position information using the first position and the second position, of the first position and the second position, the first position is preferably adjusted to that of the time of detection of the second position that has high reliability. Here, the object width W remaining unchanged over time indicates that the width of the object does not change based on time. This concept excludes cases in which the object width W in the captured image changes as a result of changes in the distance to the own vehicle CS.

Therefore, the ECU 20 corrects the electromagnetic wave distance such that the electromagnetic wave distance acquired as the first position and the width angle $\theta w$ acquired as the second position are positions of the object detected at the same time. Then, the ECU 20 calculates the object width W indicating the size of the object in the lateral direction as the position information, based on the corrected electromagnetic wave distance and the width angle $\theta w$. In this case, as a result of the first position being corrected with reference to the second position that has high reliability, error in the calculated object width W can be reduced.

When the center position of the object that significantly changes over time is calculated as the position information, of the first position and the second position, the second position is preferably corrected with reference to the first position of which the time of detection is recent. Therefore, the ECU 20 corrects the image azimuth $\theta 2$ such that the electromagnetic wave distance acquired as the first position and the image azimuth $\theta 2$ acquired as the second position are positions of the object detected at the same time.

Then, the ECU 20 calculates the lateral position, which is the center position in the lateral direction of the object, as the position information based on the electromagnetic wave distance and the corrected image azimuth $\theta 2$. In this case, when the lateral position of the object that significantly changes over time is calculated, error in the center position can be reduced.

Second Embodiment

Figure 10:
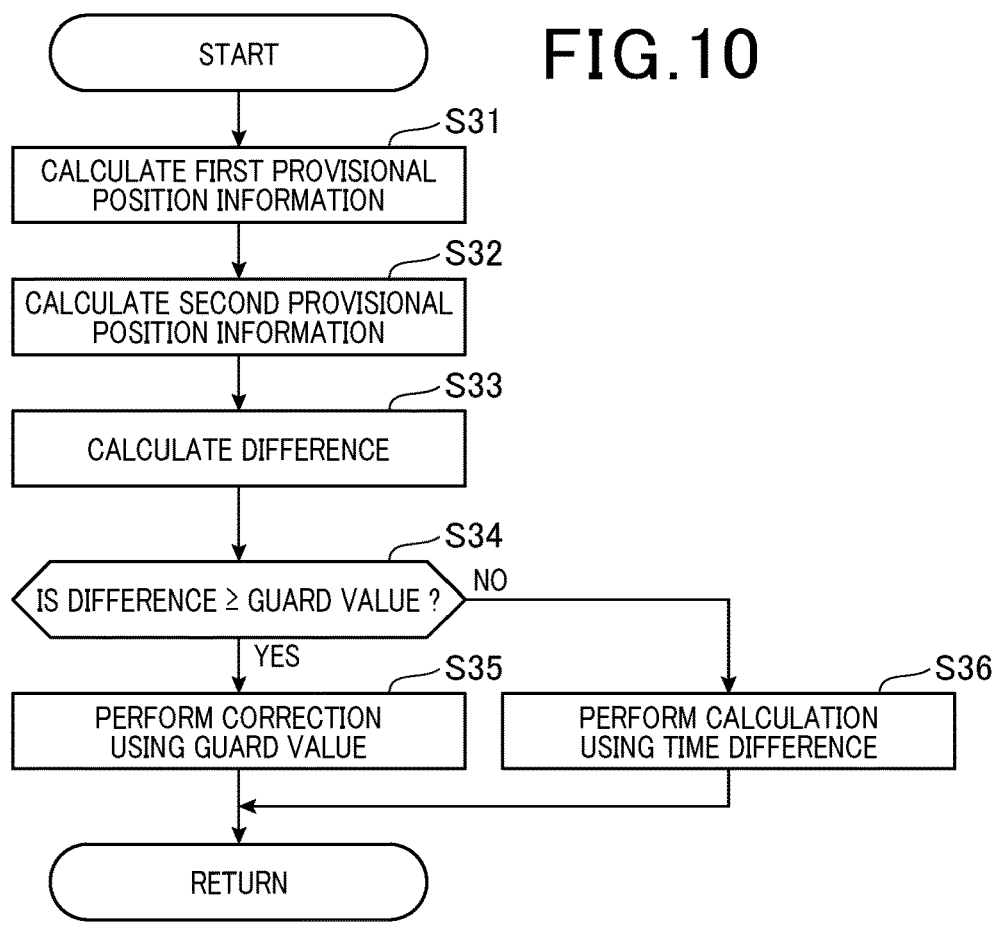
FIG. 10 is a flowchart for explaining a process performed at step S17 in FIG. 7 according to a second embodiment.

Configurations according to a second embodiment that differ from those according to the first embodiment will mainly be described. FIG. 10 is a flowchart for explaining a process performed at step S16 in FIG. 7.

At step S31, the ECU 20 calculates first provisional position information based on the electromagnetic wave distance included in the first position and the width angle ($w included in the second position that are acquired at step S11. According to the present embodiment, the object width W is calculated as the first provisional position information. Step S31 functions as a first provisional information calculating unit.

At step S32, in a manner similar to that at S17, the ECU 20 calculates second provisional position information based on the corrected distance calculated using the expression (5), above, and the width angle $\theta w$. According to the present embodiment, the object width W is calculated as the second provisional position information. Step S32 functions as a second provisional information calculating unit.

At step S33, the ECU 20 calculates a difference between the first provisional position information calculated at step S31 and the second provisional position information calculated at step S32.

At step S34, the ECU 20 makes a determination regarding the difference calculated at step S33. According to the present embodiment, the ECU 20 compares the difference calculated at step S33 with a threshold Th1. The threshold Th1 indicates an allowance value of an amount of change from the position information of the object when the first position or the second position is not corrected. For example, the threshold Th1 is an experimentally calculated value.

When determined that the difference exceeds the threshold Th1 (YES at step S34), at step S35, the ECU 20 sets the corrected distance to a value ranging from the electromagnetic wave distance acquired as the first position to a value that does not exceed a guard value. Because the object width W calculated using the corrected electromagnetic wave distance exceeds the allowable value, the ECU 20 sets the corrected distance to a value that is less than the value calculated using the time difference information. For example, the ECU 20 calculates the correction distance by an expression (6), below.

$$CY1 = Y1 \pm GV \qquad (6)$$

Here, GV denotes the guard value.

Meanwhile, when determined that the difference is equal to or less than the threshold Th1 (NO at step S34), at step S36, the ECU 20 calculates the corrected distance by correcting the electromagnetic wave distance using the time difference ΔT. In this case, the ECU 20 calculates the corrected distance using the expression (5), above.

According to the present embodiment described in detail above, the following excellent effects can be obtained.

As a result of the first position or the second position being corrected based on the time difference information, error in the position information calculated using the positions may increase. Therefore, the ECU 20 calculates the first provisional position information based on the acquired first position and second position. The ECU 20 also calculates the second provisional position information based on the first position and the corrected second position, or the second position and the corrected first position.

Then, when determined that the difference between the first provisional position information and the second provisional position information exceeds the predetermined threshold, the ECU 20 sets the first provisional position information that is changed within the range of the predetermined threshold as the position information. When determined that the difference between the first provisional position information and the second provisional position information is equal to or less than the predetermined threshold, the ECU 20 sets the second provisional position information as the position information. In this case, increase in error in the position information resulting from correction of the first position or the second position can be prevented. Reduced accuracy of the position information can be suppressed.

Third Embodiment

Configurations according to a third embodiment that differ from those according to the first embodiment will mainly be described. According to the third embodiment, as a result of the time difference information being calculated based on the timings at which the ECU 20 acquires the first detection position P1 and the second detection position P2, even when a delay occurs in a second update cycle UC2, the time difference ΔT can be appropriately calculated.

Figure 11:
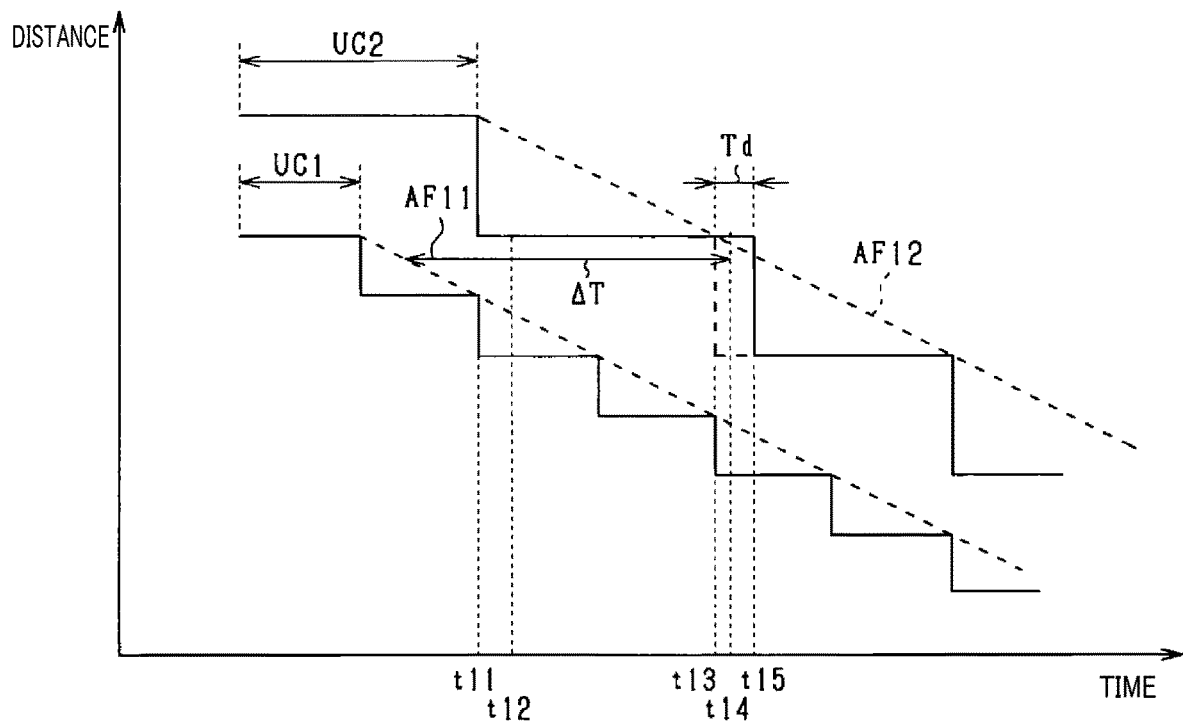
FIG. 11 is a diagram of a relationship between an update count of a first detection position and an update count of a second detection position according to a third embodiment.

FIG. 11 shows an example in which the second update cycle UC2 is twice as long as a first update cycle UC1. In this case, the first detection position P1 is updated twice during a period in which the second detection position P2 is updated once. In addition, in FIG. 11, after the first detection position P1 and the second detection position P2 are updated at time t11, the ECU 20 latches the first detection position P1 and the second detection position P2 at time t12. Therefore, the ECU 20 calculates the time difference information at time t11 based on the time difference ΔT between the first amount of time required for the electromagnetic wave sensor 31 to detect the object and the second amount of time required for the image sensor 32 to detect the object.

Meanwhile, a delay in the second update cycle UC2 occurs at time t13. The second detection position P2 is updated at time t15 rather than at time t13. In this state, when the ECU 20 latches the first detection position P1 and the second detection position P2 at time t14 that is between time t13 and time t15, the first detection position P1 has been updated but the second detection position P2 has not been updated. The time difference ΔT increases by an amount corresponding to the first update cycle UC1.

Therefore, according to the third embodiment, the method for calculating the time difference information is changed based on count values of the second update cycle UC2 and the first update cycle UC1. According to the third embodiment, as shown in FIG. 11, as the method for calculating the time difference information, an approximation formula AF11 is calculated. In the approximation formula AF11, a horizontal axis indicates time and a vertical axis indicates the detection result regarding the object from the electromagnetic wave sensor 31. In addition, an approximation formula AF12 is calculated. In the approximation formula AF12, a horizontal axis indicates time and a vertical axis indicates the detection result regarding the object from the image sensor 32.

In FIG. 11, the first detection position P1 and the second detection position P2 are discretely acquired. Therefore, the approximation formulas AF11 and AF12 are calculated as line segments that connect falling edge positions of the update cycles. Then, the time difference information is calculated based on an average value of the difference between the same detection results of the approximation formulas AF11 and AF12.

Figure 12:
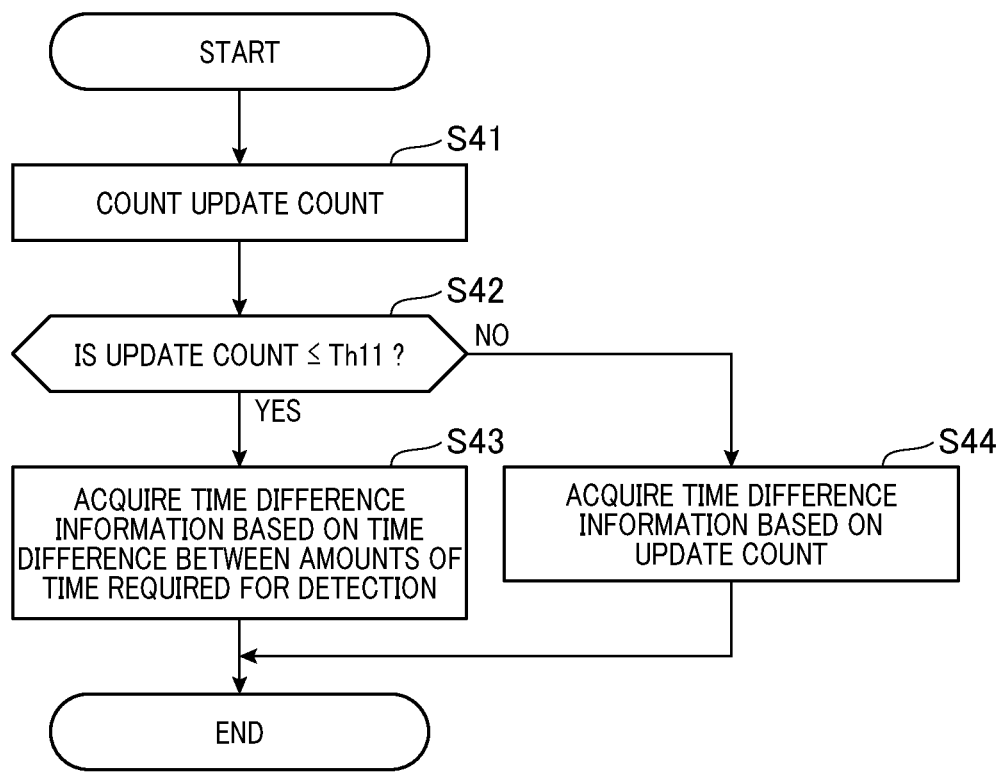
FIG. 12 is a flowchart for describing a process performed to calculate time difference information in the third embodiment.

FIG. 12 is a flowchart for explaining processes performed by the ECU 20 to calculate the time difference ΔT. For example, the ECU 20 performs the processes in FIG. 12 at a predetermined cycle.

At step S41, the ECU 20 counts an update count of the first detection position P1 during a period from when the second detection position P2 is updated until when the second detection position P2 is newly updated. The update count is a value indicating a count of the number of updates of the first detection position P1 or the second detection position P2. According to the present embodiment, the ECU 20 includes a first counter that records the update count of the first detection position P1 and a second counter that records the update count of the second detection position P2. Therefore, the ECU 20 can count the update count of the first detection position P1 during the period from when the second detection position P2 is updated until when the second detection position P2 is newly updated, based on the changes in the count value of the first counter and the changes in the count value of the second counter. Step S41 functions as a counting unit.

At step S42, the ECU 20 determines whether or not the update count at the time the ECU 20 acquires the first position and the second position is less than a predetermined value Th11. The predetermined value Th11 indicates the number of times that the first detection position P1 is updated during the second update cycle UC2. In the example in FIG. 1, the second update cycle UC2 is twice the length of the first update cycle UC1. Therefore, the predetermined value Th11 is set to 2. Step S42 functions as an update count determining unit.

When determined that the update count is equal to or less than the predetermined value Th11 (YES at step S42), the ECU 20 determines that a delay has not occurred in the second update cycle UC2 and proceeds to step S43. At step S43, the ECU 20 acquires the time difference information based on the time difference ΔT between the first amount of time required for the electromagnetic wave sensor 31 to detect the object and the second amount of time required for the image sensor 32 to detect the object. According to the present embodiment, the ECU 20 calculates the time difference information using an expression (7), below.

$$\Delta T = \Delta T0 \quad (7)$$

Here, ΔT0 denotes initial time difference information. For example, ΔT0 is a value calculated by the ECU 20 based on the amount of time required for the electromagnetic wave sensor 31 to detect the object and the amount of time required for the image sensor 32 to detect the object.

When determined that the update count exceeds the predetermined value Th1, at step S44, the ECU 20 calculates the time difference information using the number of updates exceeding the predetermined value Th11. The ECU 20 calculates the time difference information using an expression (8), below.

$$\Delta T = \Delta T0 + F \times \Delta UN \quad (8)$$

Here, F denotes the update count. ΔUN denotes the number of updates of the first detection position P1 exceeding the predetermined value Th11.

Steps S43 and S44 function as a time difference acquiring unit. Upon completing the process at step S43 or S44, the ECU 20 temporarily ends the processes in FIG. 12. Therefore, at step S14 or S16 in FIG. 7, the ECU 20 calculates the corrected azimuth or the corrected distance using the time difference ΔT calculated by the processes in FIG. 12.

According to the present embodiment described in detail above, the following excellent effects can be obtained.

As a result of a delay occurring the second update cycle UC2 or the like, the first detection position P1 may be updated before the second detection position P2 is updated. Therefore, the ECU 20 counts the update count of the number of times that the first detection position P1 is updated during a period after the second detection position P2 is updated and before the second detection position P2 is newly updated. Then, when determined that the update count at the time the first detection position P1 and the second detection position P2 are acquired is equal to or less than the predetermined value Th11, the ECU 20 acquires the time difference information based on the time difference ΔT between the first amount of time and the second amount of time.

Meanwhile, when determined that the update count at the time the first detection position P1 and the second detection position P2 are acquired is greater than the predetermined value Th1, the ECU 20 acquires, as the time difference information, the value obtained by adding the first update cycle UC1 based on the number of updates exceeding the predetermined value to the difference between the first amount of time and the second amount of time. In this case, even when a delay occurs in the update cycle of the second detection position P2, the time difference ΔT can be appropriately calculated.

Fourth Embodiment

Configurations according to a fourth embodiment that differ from those according to the first embodiment will mainly be described. According to the fourth embodiment, when the first position or the second position is corrected, whether or not correction is performed is changed based on a reliability level of a position serving as a reference for the correction.

Figure 13:
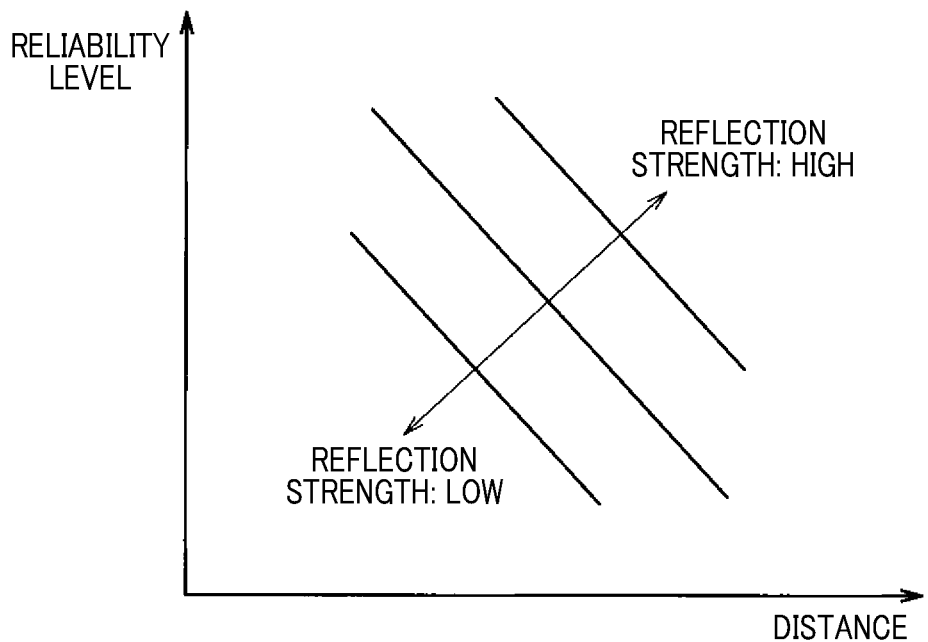
FIG. 13 is a graph for explaining calculation of a reliability level of an electromagnetic wave distance according to a fourth embodiment.

FIG. 13 is a diagram for explaining calculation of a reliability level of the electromagnetic wave distance Y1. In the graph shown in FIG. 13, a horizontal axis indicates a distance from the reference point P0 to the object indicated by the electromagnetic wave distance Y1. A vertical axis indicates the reliability level. Regarding the electromagnetic wave distance Y1, the reliability level increases as the distance from the reference point P0 to the object becomes closer, within a predetermined range. Conversely, the reliability level decreases as the distance from the reference point P0 to the object becomes farther. In addition, the reliability level increases as a reception strength of the electromagnetic wave sensor 31 increases. The reliability level decreases as the reception strength of the electromagnetic wave sensor 31 decreases. The reception strength is transmitted from the electromagnetic wave sensor 31 to the ECU 20, together with the first detection position P1, when the electromagnetic wave sensor 31 transmits the first detection position P1 to the ECU 20.

Figure 14:
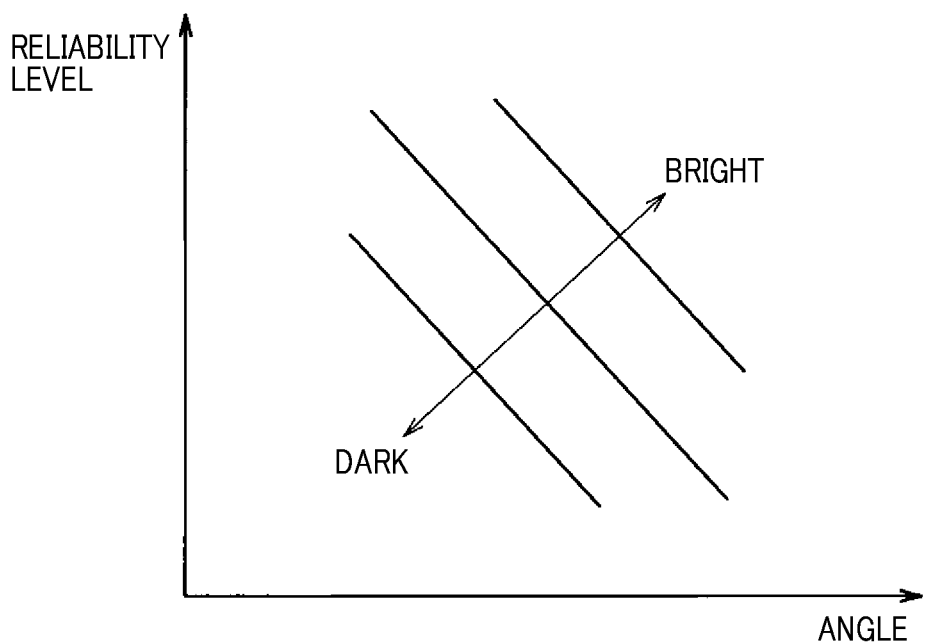
FIG. 14 is a graph for explaining calculation of a reliability level of an azimuth angle in the fourth embodiment.

FIG. 14 is a graph for explaining calculation of the reliability level of the azimuth angle. In the graph shown in FIG. 14, a horizontal axis indicates the angle of the image azimuth θ2. A vertical axis indicates the reliability level. Regarding the image azimuth θ2, the reliability level increases as the angle to the object with reference to the Y axis decreases. Conversely, the reliability level decreases as the angle to the object with reference to the Y axis increases. In addition, the reliability level increases as the brightness of around the own vehicle CS increases. The reliability level decreases as the brightness of around the own vehicle CS decreases. The brightness of around the own vehicle CS is determined using a detection value detected by the illuminance sensor 33 and time clocked by the ECU 20.

Figure 7:
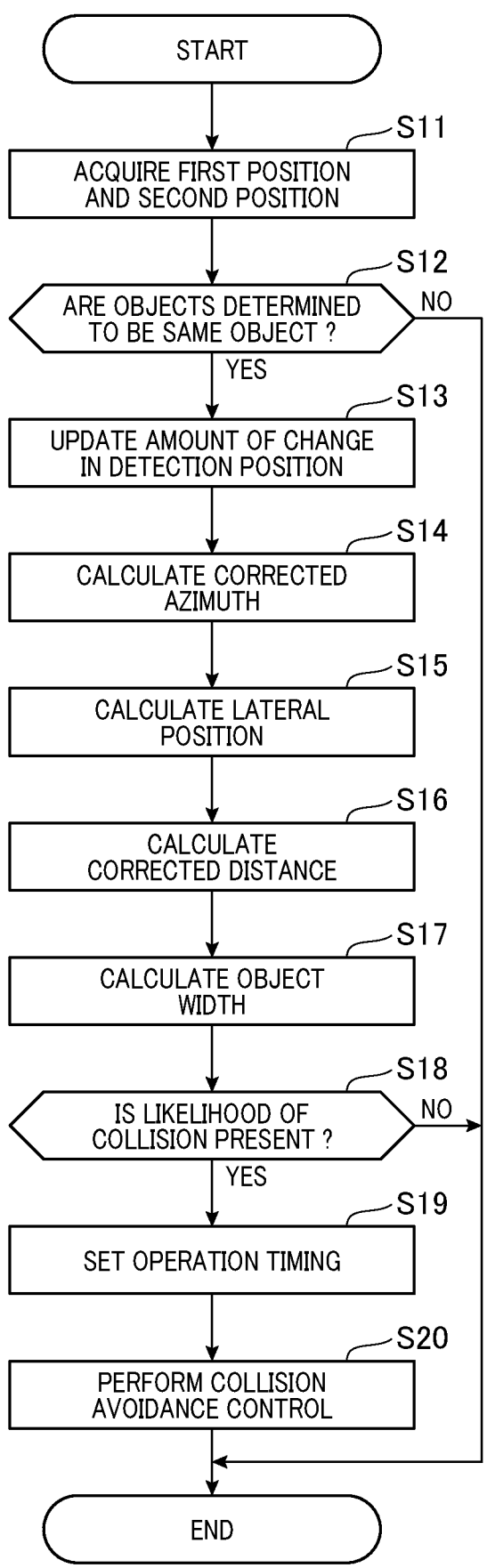
FIG. 7 is a flowchart for explaining collision avoidance control performed by an electronic control unit (ECU) in the first embodiment.

In the calculation of the corrected azimuth at step S14 in FIG. 7, the ECU 20 calculates the reliability level of the electromagnetic wave distance. When determined that the calculated reliability level is equal to or greater than a threshold, the ECU 20 determines that the reliability level of the electromagnetic wave distance serving as the reference for correction of the image azimuth θ2 is high. The ECU 20 then calculates the corrected azimuth. Meanwhile, when determined that the reliability level of the electromagnetic wave distance is less than the threshold, the ECU 20 determines that the reliability level of the electromagnetic wave distance serving as the reference for correction of the image azimuth θ2 is low. The ECU 20 does not perform correction of the image azimuth θ2. For example, a map corresponding to the graph shown in FIG. 13 is stored in the ECU 20. The ECU 20 then calculates the reliability level of the electromagnetic wave distance based on the map.

In addition, in the calculation of the corrected distance at step S16 in FIG. 7, when determined that the reliability level of the image azimuth θ2 is equal to or greater than a threshold, the ECU 20 determines that the reliability level of the image azimuth θ2 serving as the reference for correction of the electromagnetic wave distance is high. The ECU 20 then calculates the corrected distance. Meanwhile, when determined that the reliability level of the image azimuth θ2 is less than the threshold, the ECU 20 determines that the reliability level of the image azimuth θ2 serving as the reference for correction of the electromagnetic wave distance is low. The ECU 20 does not perform correction of the electromagnetic wave distance. For example, a map corresponding to the graph in FIG. 14 is stored in the ECU 20. The ECU 20 calculates the reliability of the image azimuth θ2 based on the map.

According to the present embodiment described in detail above, the following excellent effects can be obtained.

The ECU 20 corrects the first position based on the time difference information under a condition that, when the first position is corrected such that the first position and the second position are positions of the object detected at the same time, the reliability of the second position is equal to or greater than the threshold. In addition, the ECU 20 corrects the second position under a condition that, when the second position is corrected such that the first position and the second position are positions of the object detected at the same time, the reliability of the first position is equal to or greater than the threshold. In this case, as a result of whether or not the first position or the second position is corrected being changed based on the reliability level of the position serving as the reference, the corrected position can be appropriately calculated.

OTHER EMBODIMENTS

Use of the update cycle of the first detection position P1 as the first amount of time and use of the update cycle of the second detection position P2 as the second amount of time are merely examples. In addition, the time difference information based on the positions of the electromagnetic wave distance and the image azimuth may be stored in the ECU 20 as a map. The ECU 20 may acquire the time difference information with reference to the map.

According to the second embodiment, a guard value may be applied to the calculation of the corrected azimuth at step S14 in FIG. 7. In this case, at step S31, the ECU 20 calculates the lateral position as the first provisional position information based on the electromagnetic wave distance included in the first position and the azimuth angle included in the second position. At step S32, the ECU 20 calculates the lateral position as the second provisional position information based on the electromagnetic wave distance and the corrected azimuth.

Then, when determined that the difference calculated at step S33 exceeds the threshold (YES at step S34), at step S35, the ECU 20 sets the corrected azimuth to a value ranging from the image azimuth θ2 acquired as the second position to a value that does not exceed the guard value. Meanwhile, when determined that the difference is equal to or less than the threshold (NO at step S34), at step S36, the ECU 20 calculates the corrected azimuth using the time difference information.

The second update cycle UC2 being longer than the first update cycle UC1 is an example. The first update cycle UC1 may be longer than the second update cycle UC2. In this case, according to the third embodiment, at step S41 in FIG. 12, the ECU 20 counts the update count of the second detection position P2 during a period from when the first detection position P1 is updated until the first detection position P1 is newly updated. Then, the ECU 20 changes the method for calculating the time difference information based on the determination result regarding the update count at step S42.

As the method for determining whether or not objects are the same object, a following method may also be used. A first TTC is calculated as a margin time until the electromagnetic wave target collides with the own vehicle CS based on the first detection position P1. In addition, a second TTC is calculated as a margin time until the image target collides with the own vehicle CS based on the second detection position P2.

Then, at step S12 in FIG. 7, when a difference between the calculated first TTC and the calculated second TTC is equal to or less than a threshold, the electromagnetic wave target and the image target are determined to be the same object. In addition, the condition that the difference between the calculated first TTC and the calculated second TTC is equal to or less than the threshold, and the condition that the overlapping area OL is present between the electromagnetic wave search area Rr and the image search area Ri may both serve as conditions for determining that the objects are the same object.

Instead of the ECU 20 detecting the position (X1, Y1) on the XY plane, the electromagnetic sensor 31 may detect the position (X1, Y1) on the XY plane. In addition, instead of the ECU 20 detecting the position (X2, Y2) on the XY plane, the image sensor 32 may detect the position (X2, Y2) on the XY plane.

What is claimed is:

1. An object detection apparatus comprising:
   an acquiring unit that acquires a first position based on a detection result of an object ahead of an own vehicle that is repeatedly detected by an electromagnetic wave sensor and a second position based on a detection result of an object ahead of the own vehicle that is repeatedly detected by an image sensor;
   an object determining unit that determines whether or not an object detected by the electromagnetic wave sensor and an object detected by the image sensor are a same object based on the first position and the second position;
   a correcting unit that corrects, when the object determining unit determines that an object detected by the electromagnetic wave sensor and an object detected by the image sensor are a same object, either of the first position and the second position such that the first position and the second position are positions of the object detected at a same time, based on a time difference between a first amount of time required for the electromagnetic wave sensor to detect the object and a second amount of time required for the image sensor to detect the object;
   a calculating unit that calculates position information of the object using the first position and corrected second position, or the second position and corrected first position; and
   an amount-of-change calculating unit that calculates an amount of change per unit time in the first position or the second position, wherein
   the correcting unit corrects the first position such that the first position and the second position are positions of the object detected at the same time using the calculated amount of change in the first position and the time difference, or corrects the second position such that the first position and the second position are positions of the object detected at the same time using the calculated amount of change in the second position and the time difference.

2. The object detection apparatus according to claim 1, wherein:
   the acquiring unit acquires an electromagnetic wave distance that is a distance from the own vehicle to the object based on a detection result from the electromagnetic wave sensor as the first position, and a width angle indicating a difference in azimuth between left and right lateral positions of the object with reference to the own vehicle based on a detection result from the image sensor as the second position;
   the correcting unit corrects the electromagnetic wave distance such that the electromagnetic wave distance and the width angle are positions of the object detected at the same time; and
   the calculating unit calculates an object width indicating a size of the object in a lateral direction based on the corrected electromagnetic wave distance and the width angle, as the position information.

3. The object detection apparatus according to claim 1, wherein:

the first amount of time is shorter than the second amount of time;

the acquiring unit acquires an electromagnetic wave distance that is a distance from the own vehicle to the object based on a detection result from the electromagnetic wave sensor as the first position, and an image azimuth of the object with reference to the own vehicle as the second position;

the correcting unit corrects the image azimuth such that the electromagnetic wave distance and the image azimuth are positions of the object detected at the same time; and the calculating unit calculates a center position of the object in a lateral direction based on the corrected image azimuth and the electromagnetic wave distance, as the position information.

4. The object detection apparatus according to claim 1, further comprising:

a first provisional information calculating unit that calculates first provisional position information based on the first position and the second position acquired by the acquiring unit;

a second provisional information calculating unit that calculates second provisional position information based on the corrected first position and the second position, or the corrected second position and the first position, wherein the calculating unit sets, when a difference between the first provisional position information and the second provisional position information exceeds a predetermined threshold, the first provisional position information within a range of the predetermined threshold as the position information, and sets, when the difference between the first provisional position information and the second provisional position information is equal to or less than the predetermined threshold, the second provisional position information as the position information.

5. The object detection apparatus according to claim 1, wherein:

the second amount of time is longer than the first amount of time; and when a cycle in which a first detection position that is the detection result regarding the object from the electromagnetic wave sensor is updated is a first update cycle, and a cycle in which a second detection position that is the detection result regarding the object from the image sensor is updated is a second update cycle, the object detection apparatus includes a count unit that counts an update count of the first detection position during a period from when the second detection position is updated until when the second detection position is newly updated, an update count determining unit that determines whether or not the update count at a time when the acquiring unit acquires the first position and the second position is less than a predetermined value that indicates a number of times that the first detection position is updated during the second amount of time, and a time difference acquiring unit that, when the update count is equal to or less than the predetermined value, sets a difference between the first amount of time and the second amount of time as the time difference, and when the update count is greater than the predetermined value, sets a value obtained by adding the first amount of time based on a number of updates exceeding a predetermined threshold to the difference between the first amount of time and the second amount of time as the time difference.

6. The object detection apparatus according to claim 1, wherein:

the correcting unit acquires a reliability level of the first position or the second position;

corrects the first position such that the first position and the second position are positions of the object detected at the same time, based on the time difference, under a condition that the reliability level of the second position is equal to or greater than a threshold; and corrects the second position such that the first position and the second position are positions of the object detected at the same time, based on the time difference, under a condition that the reliability level of the first position is equal to or greater than a threshold.

7. The object detection apparatus according to claim 1, further comprising:

a collision determining unit that determine a likelihood of a collision between the object and the own vehicle based on the calculated position information of the object; and a control unit that sets an operation timing for a collision avoidance control to avoid a collision with the object, and performs the collision avoidance control at the set operation timing.

8. The object detection apparatus according to claim 7, further comprising:

the collision avoidance control includes operating automatic braking of a brake apparatus that decelerates a vehicle speed of the own vehicle.

9. The object detection apparatus according to claim 7, further comprising:

the collision avoidance control includes issuing a warning sound to a driver of the own vehicle by a warning apparatus provided in the own vehicle.

10. An object detection method comprising:

acquiring a first position based on a detection result regarding an object ahead of an own vehicle that is repeatedly detected by an electromagnetic wave sensor and a second position based on a detection result regarding the object that is repeatedly detected by an image sensor;

determining whether or not an object detected by the electromagnetic wave sensor and an object detected by the image sensor are a same object based on the first position and the second position;

in a case in which an object detected by the electromagnetic wave sensor and an object detected by the image sensor are determined to be a same object, correcting either of the first position and the second position such that the first position and the second position are positions of the object detected at a same time, based on a time difference between a first amount of time required for detection of the first position and a second amount of time required for detection of the second position;

calculating position information of the object using the first position and the corrected second position, or the second position and the corrected first position; and calculating an amount of change per unit time in the first position or the second position, wherein correcting either of the first position and the second position comprises correcting the first position such that the first position and the second position are positions of the object detected at the same time using the calculated amount of change in the first position and the time difference, or corrects the second position such that the first position and the second position are positions of the object detected at the same time using the calculated amount of change in the second position and the time difference.

11. An object detection apparatus comprising:

an acquiring unit that acquires a first position based on a detection result of an object ahead of an own vehicle that is repeatedly detected by an electromagnetic wave sensor and a second position based on a detection result of an object ahead of the own vehicle that is repeatedly detected by an image sensor;

an object determining unit that determines whether or not an object detected by the electromagnetic wave sensor and an object detected by the image sensor are a same object based on the first position and the second position;

a correcting unit that corrects, when the object determining unit determines that an object detected by the electromagnetic wave sensor and an object detected by the image sensor are a same object, either of the first position and the second position such that the first position and the second position are positions of the object detected at a same time, based on a time difference between a first amount of time required for the electromagnetic wave sensor to detect the object and a second amount of time required for the image sensor to detect the object; and a calculating unit that calculates position information of the object using the first position and corrected second position, or the second position and corrected first position, wherein:

the second amount of time is longer than the first amount of time; and when a cycle in which a first detection position that is the detection result regarding the object from the electromagnetic wave sensor is updated is a first update cycle, and a cycle in which a second detection position that is the detection result regarding the object from the image sensor is updated is a second update cycle, the object detection apparatus includes a count unit that counts an update count of the first detection position during a period from when the second detection position is updated until when the second detection position is newly updated, an update count determining unit that determines whether or not the update count at a time when the acquiring unit acquires the first position and the second position is less than a predetermined value that indicates a number of times that the first detection position is updated during the second amount of time, and a time difference acquiring unit that, when the update count is equal to or less than the predetermined value, sets a difference between the first amount of time and the second amount of time as the time difference, and when the update count is greater than the predetermined value, sets a value obtained by adding the first amount of time based on a number of updates exceeding a predetermined threshold to the difference between the first amount of time and the second amount of time as the time difference.

* * * * *